(12) United States Patent
Gutowski

(10) Patent No.: US 6,693,884 B1
(45) Date of Patent: *Feb. 17, 2004

(54) METHOD OF QUANTIFYING THE QUALITY OF SERVICE IN A CDMA CELLULAR TELEPHONE SYSTEM

(75) Inventor: Stanley J. Gutowski, Arlington, VA (US)

(73) Assignee: Scoreboard, Inc., Herndon, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,023

(22) Filed: Nov. 19, 1998

(51) Int. Cl.[7] .............................................. H04B 7/216
(52) U.S. Cl. ....................................... 370/335; 455/446
(58) Field of Search ................................ 370/252, 335, 370/342, 332, 320, 328, 500; 455/63, 453, 446, 447, 449

(56) References Cited

U.S. PATENT DOCUMENTS

| 5,287,544 | A | * | 2/1994 | Menich et al. ............. 455/33.1 |
| 5,732,328 | A | * | 3/1998 | Mitra et al. .................... 445/69 |
| 5,799,005 | A | * | 8/1998 | Soliman ...................... 370/335 |
| 6,072,778 | A | | 6/2000 | Labedz et al. |
| 6,405,043 | B1 | * | 6/2002 | Jensen et al. ............... 455/446 |

FOREIGN PATENT DOCUMENTS

| DE | 196 17 440 A | 11/1997 |
| EP | 0 868 101 | 9/1998 |
| EP | 1 011 208 | 6/2000 |

* cited by examiner

Primary Examiner—Chi Pham
Assistant Examiner—Alexander O. Boakye
(74) Attorney, Agent, or Firm—Duane Morris LLP

(57) ABSTRACT

A process which determines all locations in a service area which are subject to interference-causing limitations, assigns an average service level to each such location, sums the service levels at all such locations, and divides the sum of the service levels at all such locations by the total service level for the service area to produce an interference value.

8 Claims, 3 Drawing Sheets

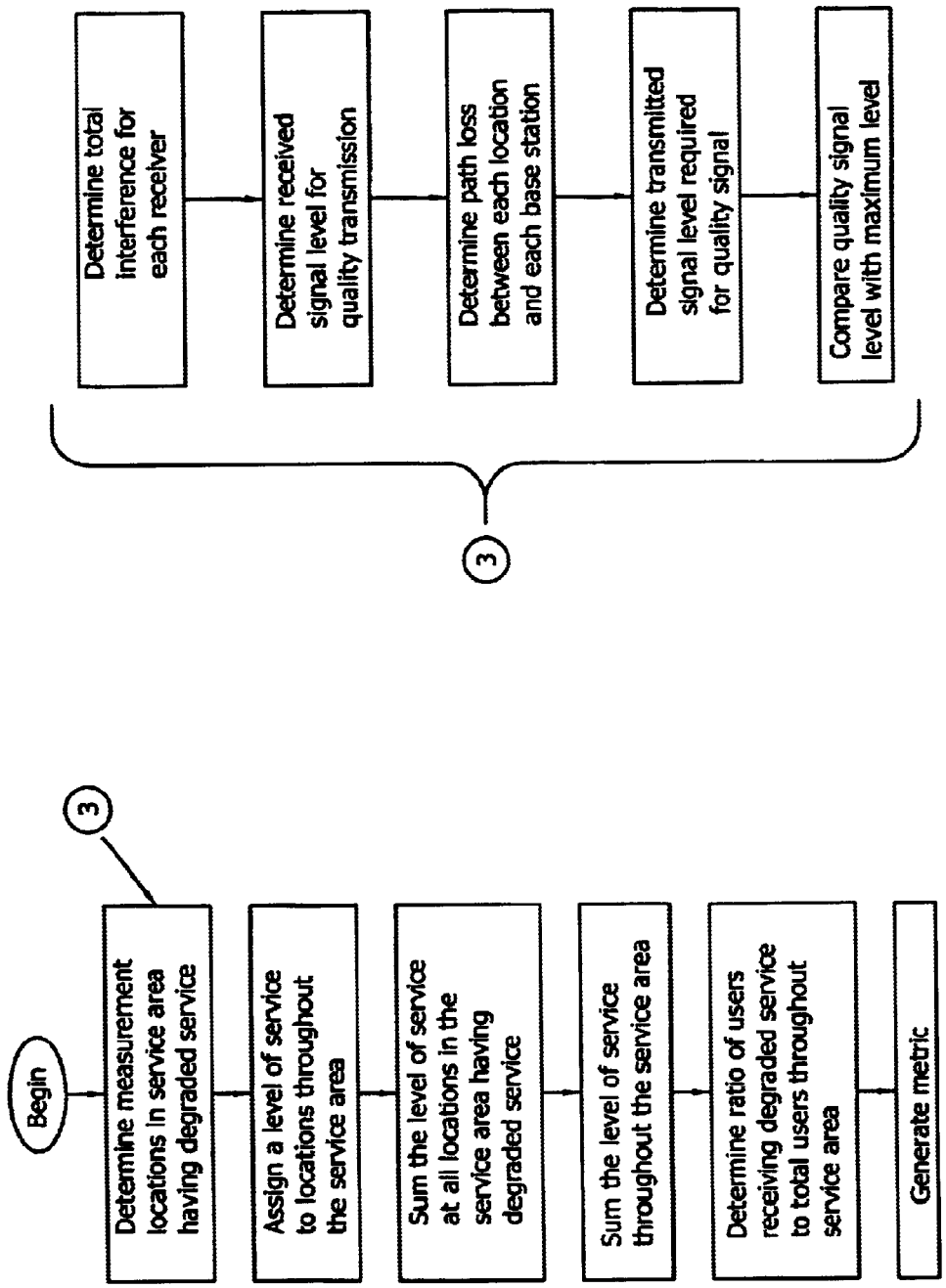

METHOD OF QUANTIFYING THE QUALITY OF SERVICE IN A CDMA CELLULAR TELEPHONE SYSTEM

BACKGROUND OF THE INVENTION

1. Field of the Invention

This invention relates to cellular telephone systems and, more particularly, to processes for quantifying the performance of CDMA cellular telephone systems.

2. History of the Prior Art

Presently available commercial mobile communication systems typically include a plurality of fixed base stations (cells) each of which transmits signals to and receives signals from mobile units within its communication area. Each base station is assigned a plurality of channels over which it can communicate with mobile units. A mobile unit within range of the base station communicates with the external world through the base station using these channels. Typically, the channels used by a base station are selected so that signals on any channel do not interfere with signals on another channel used by that base station.

In order to allow mobile units to transmit and receive telephone communications as the units travel over a wide geographic area, each cell is normally physically positioned so that its area of coverage is adjacent to and overlaps the areas of coverage of a number of other cells. When a mobile unit moves from an area covered by one base station to an area covered by another base station, communication with the mobile unit is transferred (handed off from one base station to another base station in an area where the coverage from different cells overlaps.

It is axiomatic that cellular telephone transmissions between the mobile units and the cells should be as free from interference as possible. The manner in which this is accomplished differs depending on the characteristics of the particular cellular system.

In the most prevalent American Mobile Phone System (AMPS) system, channels are defined by frequency. A frequency band providing approximately four hundred different adjoining FM frequency channels is allotted to each cellular system operator. In a typical AMPS system, each channel uses a fixed FM frequency band for downlink transmission from a base station to a mobile unit and another fixed FM frequency band for uplink transmission from a mobile unit to a cell. Typically, the frequencies assigned to the downlink transmissions for an entire AMPS cellular system immediately adjoin one another and are widely separated from the frequencies assigned to the uplink transmissions which also immediately adjoin one another.

Since channels are defined by frequency in an AMPS system, interference with any particular transmission is essentially due to transmissions on the same or immediately adjacent channels. To reduce this interference, an operator assigns channels to any single base station which are separated from one another in frequency sufficiently to eliminate interference between those channels. For example, an operator may allot to a base station a set of channels with frequencies which are each separated from the next by some large number (e.g., twenty-one) channels carrying intermediate frequencies.

Moreover, since a mobile unit in an AMPS system moving from an area covered by one base station to that covered by another base station must be transferred from one base station to the other in an area in which cell coverage overlaps, interference with base stations having overlapping cell coverage must also be eliminated. To do this, the channels allotted to the adjoining cells are carefully selected to eliminate the same frequencies. This is sometimes accomplished by assigning channels to a central cell which are widely separated in frequency in the manner described above, and then assigning channels to the cells surrounding that central cell using a pattern which increases each channel assignment by some number for each sequential cell surrounding the central cell. This produces what may be visualized as a honeycomb pattern of cells having a central cell surrounded by a number of overlapping cells transmitting on different frequencies. The same honeycomb pattern extends outward throughout the system with each cell surrounding the central cell functioning as a central cell surrounded by its own overlapping cells producing what is referred to as a reuse pattern. In such a pattern, interference on the same channel usually comes from cells at some distance from the cell carrying the useful information.

In most cellular systems, especially those with cells in urban areas carrying heavy traffic, a position at which a cell is situated includes two or three individual transceiving stations (referred to as "sectors") each of which may include channels having the above-described frequency allotment of channels. The antennas of each sector are typically arranged to provide 180 or 120 degree coverage. The terms cells, sectors, and base stations are normally used interchangeably in this specification unless the context indicates otherwise. If an AMPS system includes significant numbers of sectored cells, six cells arranged in a honeycomb pattern surrounding a central cell may all be assigned different and theoretically non-interfering channels. However, outside the initial central cell and its immediately surrounding cells, the frequency reuse pattern requires that channels be replicated at much closer ranges than in a non-sectored system.

In another common type of mobile system called Time Division Multiple Access (TDMA), frequencies are assigned to the entire system in groups much like they are assigned in an AMPS system. However, within any frequency, each base station sends and receives in bursts during some number of different intervals or time slots. These time intervals within frequency bands then effectively constitute the individual channels. By using these intervals and assuring that the group of frequencies assigned to any individual base station differ from one another and from the frequencies assigned to base stations surrounding each individual base station, a channel reuse pattern is established which allows substantially greater use of the frequency spectrum because of the time division process.

A newer type of mobile system called Code Division Multiple Access (CDMA) uses encoded digital signals to transmit data. All of the base stations and mobile units of a CDMA system presently use the same "spread spectrum" frequency band of 1.25 megacycles to transmit the encoded digital signals although other band widths are presently proposed. The information bits of each transmission are expanded using coding information called a pseudo noise (PN) code. Each sector throughout a system uses the same PN code to encode the information transferred. Then each sector identifies itself by using a time offset (generally referred to as a pseudo noise (PN) offset) from some repeating initial time in the expanded transmission. Thus, one sector may begin an encoded transmission at the initial time, a second sector at an offset of one unit from the initial time, a third at an offset of two units, and so on up to a total of 512 offset units. Each transmission with a sector is placed on what is effectively a separate channel by further encoding the expanded transmission with one of a plurality of Walsh codes. A Walsh code is a mask used to encode and decode transmissions which eliminates transmissions sent using other Walsh codes. A transmission on a particular channel is decoded by applying a mask including the Walsh and PN codes to the received pattern of information bits commencing at the PN offset designated for the particular channel.

The CDMA system of transmission offers a number of advantages. One of these advantages is that a mobile unit may be receiving the same information from a number of different cells or sectors at the same instant. Since all transmissions take place on the same frequency band, a mobile unit actually receives all of the information which is available within its range. However, it only decodes information on channels which are directed to it. A CDMA mobile unit uses a receiver which is able to apply a number of decoding masks at the same instant to the entire spectrum of information which it receives. By knowing the Walsh codes and PN offsets defining channels which it desires to receive, a mobile unit may decode information from a single message sent to it by a number of different base stations simultaneously and combine that information to produce a single output message. Thus, while a signal from one sector may be fading, the same message may be received with adequate strength from another sector. This allows CDMA to offer the possibility of significantly better transmission.

In both AMPS and TDMA system, it is possible to reduce interference between channels by effecting frequency reuse plans in the manner described above. In theory, these forms of cell arrangement and channel assignments allows channel reuse patterns to be repeated at distances separated sufficiently to negate interference between mobile units on the same and adjacent channels.

Unfortunately, for a number reasons interference does occur in AMPS and TDMA systems even with well chosen frequency reuse plans. Antenna patterns, power levels, scattering, and wave diffraction differ from cell to cell. Buildings, various other structures, hills, mountains, foliage, and other physical objects cause signal strength to vary over the region covered by a cell. Consequently, the boundaries at which the signal strength of a channel falls below a level sufficient to support communications with a mobile unit vary widely within a cell and from cell to cell. For this reason, cells adjacent one another do not, in fact, typically form the precise geometric boundaries suggested above. Since cell boundaries must overlap to provide complete coverage of an area and allow handoff and because the boundaries of cells are imprecisely defined, signals will often interfere with one another even though they are generated by cells which are at distances theoretically sufficient to eliminate interference. This is especially true when a sectored cell pattern is used because the cells are much closer to one another than in a simple cell pattern.

In an AMPS system, a first signal on a channel from a remote cell interferes with a second (usually) stronger signal carrying a mobile transmission on the same channel within the coverage area of a cell when the drop in strength of the first signal from the second signal is less than some threshold level (typically 18 decibels). A signal from another cell on a channel at a frequency adjacent the frequency of a channel carrying a mobile transmission interferes when the drop in strength of the interfering signal from the serving signal is less than some second threshold level (typically 6 decibels).

Historically, in order to determine whether interference exists in an AMPS system, a mobile system operator relied on customer complaints. When customers register a sufficient number of complaints regarding communication at particular points in a system, an operator usually conducts a relatively expensive field test of the suspected portion of the system to measure signal strengths received from different cells. During the test, the portion of the system in which the tests are conducted is essentially disabled. Because of the expense and inconvenience, the tests are typically limited only to the suspected area. Because such tests are limited to determining the interference at those points at which a system operator expects to find interference, the efficacy of these tests is very suspect. A major problem with the process is that it does not provide a complete understanding of interference which actually exists in a system since typically only those positions at which extensive interference has been reported are tested. The process does not take into consideration all of the possible signals which might be propagating into the affected area to interfere with the carrier nor does it take into consideration the effects which a change in channel assignments may have in other areas of the system. Often (and possibly usually) this method of curing interference merely exports the interference to another portion of the system where it is only discovered when a sufficient number of complaints arise to warrant a field test of the newly isolated area of interference. Moreover, this method of eliminating interference is quite slow and labor intensive. Testing a medium sized system to eliminate interference may require as long as 400 man hours. The process greatly increases the costs without guaranteeing that interference will be eliminated. Because of the emerging nature of the market for cellular telephones, system changes which cause interference such as traffic growth are taking place constantly and at an accelerating rate.

Recently, a process has been devised by which the quality of service provided by an AMPS or TDMA system (and portions thereof) may be determined in terms of fixed verifiable quantities so that changes may be made to enhance the quality of service with an expectation that the changes will have the desired result in actually improving the quality of service provided by the system. The process utilizes data gathered during a drive of a service area during which transmitted signal strength and received signal strength at each location throughout the service area are obtained. These values provide actual data from which all locations at which interference may occur may be determined. Knowing the locations at which interference may occur allows values to be assigned to a particular service area by which an operator may quantify the quality of service and decide whether changes in the system are necessary. This process is described in U.S. patent application Ser. No. 08/887,101, entitled "Method of Improving the Operation of a Cellular Telephone System", E. Jensen et al, filed Jul. 2, 1997, and assigned to the assignee of the present invention.

Theoretically, in contrast to other types of systems, a CDMA transmission should be interference free throughout the system since data is decoded from digital information using masks which are supposed to eliminate interfering signals. However, in a CDMA system all transmissions are carried by bits transmitted on the same frequency spectrum. Because of this, information received by a mobile unit or a cell is effectively interference if the information is not directed to that particular receiver. That is, since a receiver receives all of the transmissions generated by any transmitter within range, the untranslated transmissions constitute interference in a CDMA system. Typically, before decoding, the desired transmission should have a strength not less than minus 14 dB when compared to the total strength of all transmissions being received. When the strength of the desired transmission falls below this point, the digital details of the message cannot be retrieved from the spectrum.

Encoding the signals provides a significant encoding gain because each bit of information is expanded by the pluralities of bits in each of the levels of coding. A decoded transmission of approximately 7 dB greater than interference present after decoding is just sufficient to provide signals of sufficient quality.

Because of the difference of the meaning of interference in the different types of cellular systems, the method of the above-mentioned patent application for quantifying the quality of service in AMPS or TDMA systems is not as useful when applied to CDMA systems. Consequently, interference in CDMA systems is typically eliminated at present by increasing the number of sectors when the transmissions with a sector increase beyond to a particular maximum number. However, it has been determined that such a criteria has very little to do with whether any particular sector is capable of handling additional transmissions or not. Adding sectors to a system is an expensive way of handling interference.

Consequently, it is desirable to provide a new process by which the quality of a CDMA cellular system may be quantified so that steps may be taken to improve the system.

SUMMARY OF THE INVENTION

The present invention is realized by a computer implemented process which determines all locations in a service area which are subject to interference-causing limitations, assigns an average service level to each such location, sums the service levels at all such locations, and divides the sum of the service levels at all such locations by the total service level for the service area to produce an interference value.

These and other features of the invention will be better understood by reference to the detailed description which follows taken together with the drawings in which like elements are referred to by like designations throughout the several views.

BRIEF DESCRIPTION OF THE DRAWINGS

FIG. 2 is a flow chart illustrating a process in accordance with the present invention.

FIG. 3 is a flow chart illustrating a particular embodiment of a process in accordance with the present invention.

DETAILED DESCRIPTION

Figure 1:
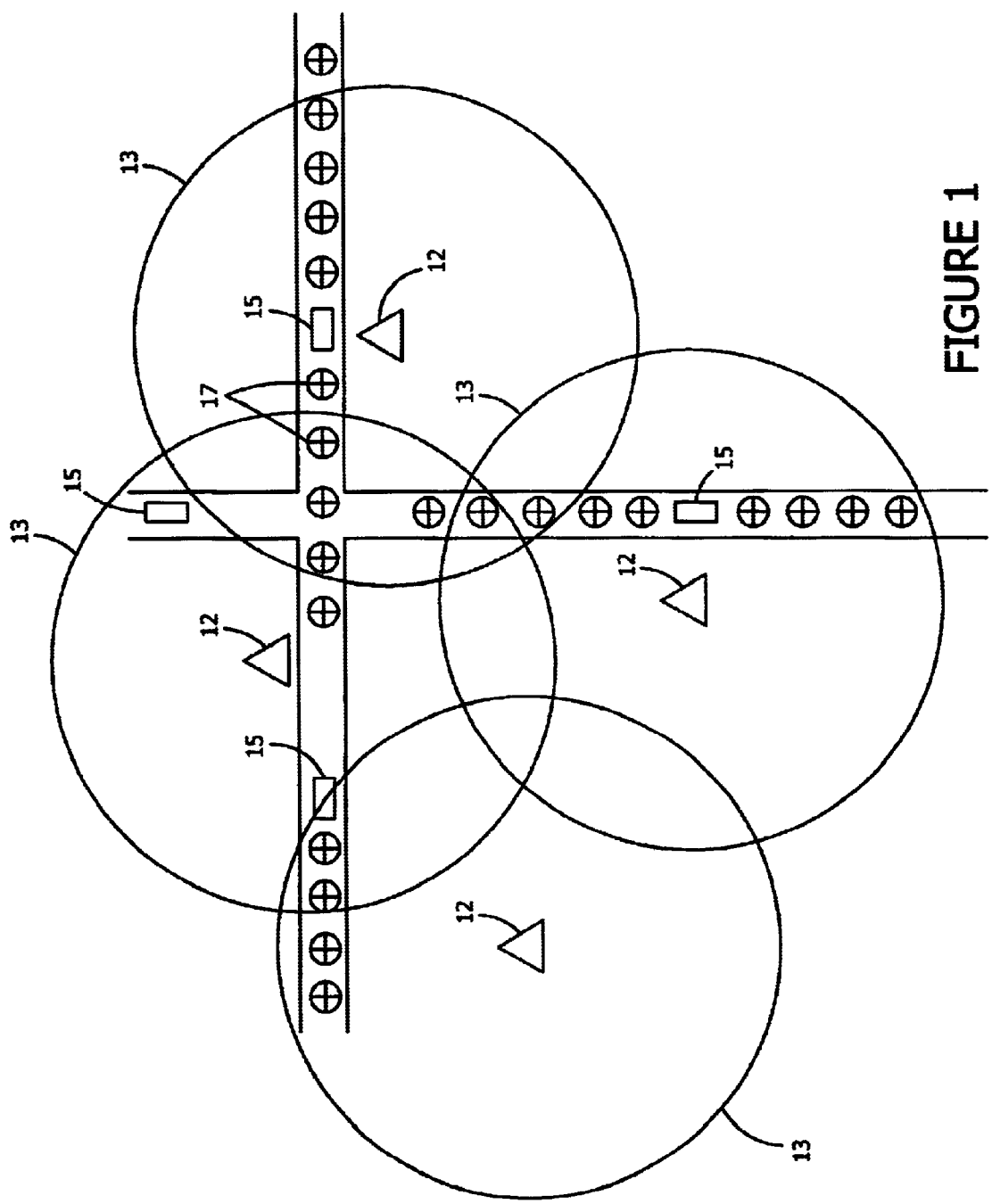
FIG. 1 is a CDMA cellular telephone system which may utilize the method of the invention.

Referring now to FIG. 1, there is illustrated a CDMA cellular telephone system 10 which includes a number of individual base stations 12 arranged to provide coverage of a service area. Each base station 12 in FIG. 1 is illustrated having an outer boundary 13 which indicates the effective limit of its communication range. The boundaries 13 of different adjacent base stations typically overlap.

Each of the base stations 12 includes at least one cell which transmits and receives communications with mobile units 15 operating within its service area. In many cases, a base station includes two or three sectors each of which includes communication equipment for communicating with a number of mobile units in an area defined partially by an antenna pattern angle of 180° or 120°, respectively, from the base station. All transmissions between a base station and mobile units in a CDMA system are digitally encoded and are carried on the same "spread spectrum" frequency band of 1.25 MHz. The digital information bits of each transmission are expanded using various levels of coding information. One such level is called a PN code. Each sector throughout a system uses the same PN code to encode the information transferred. Then each sector identifies itself by using an offset (generally referred to as a pseudo noise (PN) offset) in the expanded transmission from some repeating initial point typically established through communication with a global positioning system. Thus, one sector may begin an encoded transmission at the initial time, a second sector at an offset of one unit from the initial time, a third at an offset of two units, and so on up to a total of 512 offset units. Each transmission with a sector is placed on what is effectively a separate channel by further encoding the expanded transmission with one of a plurality of Walsh codes. A transmission on a particular channel is decoded by applying a mask including the Walsh and PN codes to the received pattern of information bits commencing at the PN offset designated for the particular channel.

The CDMA system of transmission offers a number of advantages. One of these advantages is that a mobile unit may be receiving the same message from a number of different cells or sectors at the same instant. Since all transmissions take place on the same frequency band, a mobile unit actually receives all of the information which is available within its range. However, it only decodes information on channels which are directed to it. A CDMA mobile unit uses a receiver which is able to apply a number of decoding masks at the same instant to the entire spectrum of information which it receives. By knowing the channels which it desires to receive, a mobile unit may decode information from a single message sent to it by a number of different sectors simultaneously and combine that information to produce a single output message. Thus, while a message from one sector may be fading, the same message may be received with adequate strength from another sector. This allows CDMA systems to offer the possibility of significantly better transmission.

Even with its advantages, CDMA systems do have problems. One of these is caused by the fact that all transmissions occur on the same frequency spectrum. Since all transmissions take place on the same frequency band, a mobile unit actually receives all of the transmissions which are available within its range. Those transmissions which are not directed to the particular receiver tend to conceal the desired transmissions. When the level of transmissions which are not directed to the particular receiver reaches a level greater than 14 dB more than the level of desired signals before decoding, it becomes difficult to decode the desired transmissions.

Moreover, although the information directed to the mobile is decoded using both a PN code mask at a particular PN offset and a Walsh code mask, these masks cannot completely reject all of the unwanted communications received. Transmissions paths vary in length, and sufficient leeway must be provided to detect signals directed to the mobile unit. This leeway allows interference through the decoding masks. The important element in providing good quality transmissions in a CDMA system is to maintain the strength of the desired transmission at a level greater than 7 dB above the level of all interference received after decoding.

In fact, CDMA systems include features for automatically increasing and decreasing power levels at the sectors and mobile units in order to assure clear transmissions. A mobile unit measures the strength of signals by measuring the rate at which errors occur in signals received (the frame rate error). When errors rise above a prescribed limit, a mobile unit signals the sector to increase the strength of its transmission. The sector does this, but then incrementally decreases the signal strength from the higher level until the sector is again alerted to raise the strength of the transmission. Thus, when the signal falls to a level where the frame error rate becomes too high indicating a strength below 7 dB above the interference level, the sector automatically increases the power of the signal being transmitted thereby raising the received signal level with respect to interference and increasing the signal quality.

In a similar manner, a sector measures the strength of signals received from a mobile unit by monitoring frame error rate and indicates to the mobile whether to raise or lower the strength of its transmission. When a mobile unit is in contact with a number of sectors, the mobile unit receives signals from all of the sectors indicating whether to raise or lower its transmission strength. The mobile unit responds to any signal to lower the strength of its signal since a single strong signal is sufficient to provide interference free service for the mobile. In doing so, the mobile unit attempts to keep its transmissions at a minimum signal strength sufficient to provide high voice quality.

Because of this power control, the signal strength from desired transmissions with respect to the total received signal should theoretically be equal throughout a service area. In fact, as long as the ability to utilize power control exists, the ability to add channels and users without decreasing the quality of service exists. Consequently, many sectors already serving a large number of users are very capable of adding channels and users without increasing interference in their transmissions with mobile units. However, the ability to adjust power levels cannot function if either the mobile or the sector has reached any of various maximum power levels so that it is not able to respond to the power control signals. In such a case, transmissions in the system may be subject to interference so that the quality of service suffers.

More particularly, each sector is assigned a maximum signal strength level for all transmissions and cannot raise its signal strength if it is transmitting at the maximum level. Each sector is also limited to a maximum signal strength for any individual signal transmitted to a mobile unit. In a like manner, each mobile unit is limited in the amount of power it can transmit. Consequently, whenever any of these power maximums is reached, the system is unable to adjust power in order to eliminate interference.

It would be very useful to be able to provide a quantitative evaluation of the quality of service likely to be experienced in a CDMA service area. For example, in an AMPS system, it is possible to measure the actual strengths of all signals to be transmitted between a plurality of cells and a mobile unit at a plurality of locations over an entire mobile communications system, relate data indicating the actual strengths of all signals to the physical locations from which the signals are to be transmitted, identify cells transmitting signals able to serve each location, compare frequencies used at any cell serving a location with frequencies used at other cells to identify cells transmitting signals which might interfere with signals transmitted by cells serving a location, determine whether frequencies used at any cell serving a position interfere with frequencies used at other positions over the entire mobile communications system, and quantify that interference over the system.

Unlike AMPS and TDMA systems, however, it is not a simple matter of measuring the strengths of all signals received at a particular location on the same frequency, comparing those strengths to determine whether interference may occur at a location, and summing locations exhibiting interference to determine the quality of the service.

All transmissions which are received at any location in a CDMA system are on the same frequency. There may be a very large plurality of transmissions received at the same time at any location. Most desired transmissions are self-adjusting with respect to undesired transmissions so that useful messages may be received. There is no simple manner of determining where problems with interference may exist.

The present invention provides a process for evaluating the quality of service provided by a CDMA system so that an operator may take steps to improve the quality of service.

The process is described in the flow chart of FIG. 2. The process first identifies all locations (measurement locations 17 are illustrated in FIG. 1) at which degraded service can be expected throughout the system. This is accomplished by determining whether one of the three problems which cause degradation in a CDMA system exists. If the maximum power for the sector transmitter amplifier has been reached, the maximum sector power allotted by a sector to an individual transmission has been reached, or the maximum mobile power has been reached, then that location is one which may exhibit degraded service.

In order to accomplish this determination, data relating to signal strength at locations throughout the service area are utilized. This may be the same data gathered for use in an AMPS or TDMA system utilized in the same area. Or it may be data accumulated specifically for quantifying the quality of CDMA service in the service area. In any case, the specific data utilized is data indicating transmitted signal strength of a transmission at a sector, received signal strength of the transmission at a location, and the location of receipt. In general, each of these values is accompanied by timing data which helps to relate signals to sectors and locations.

Figure 4:
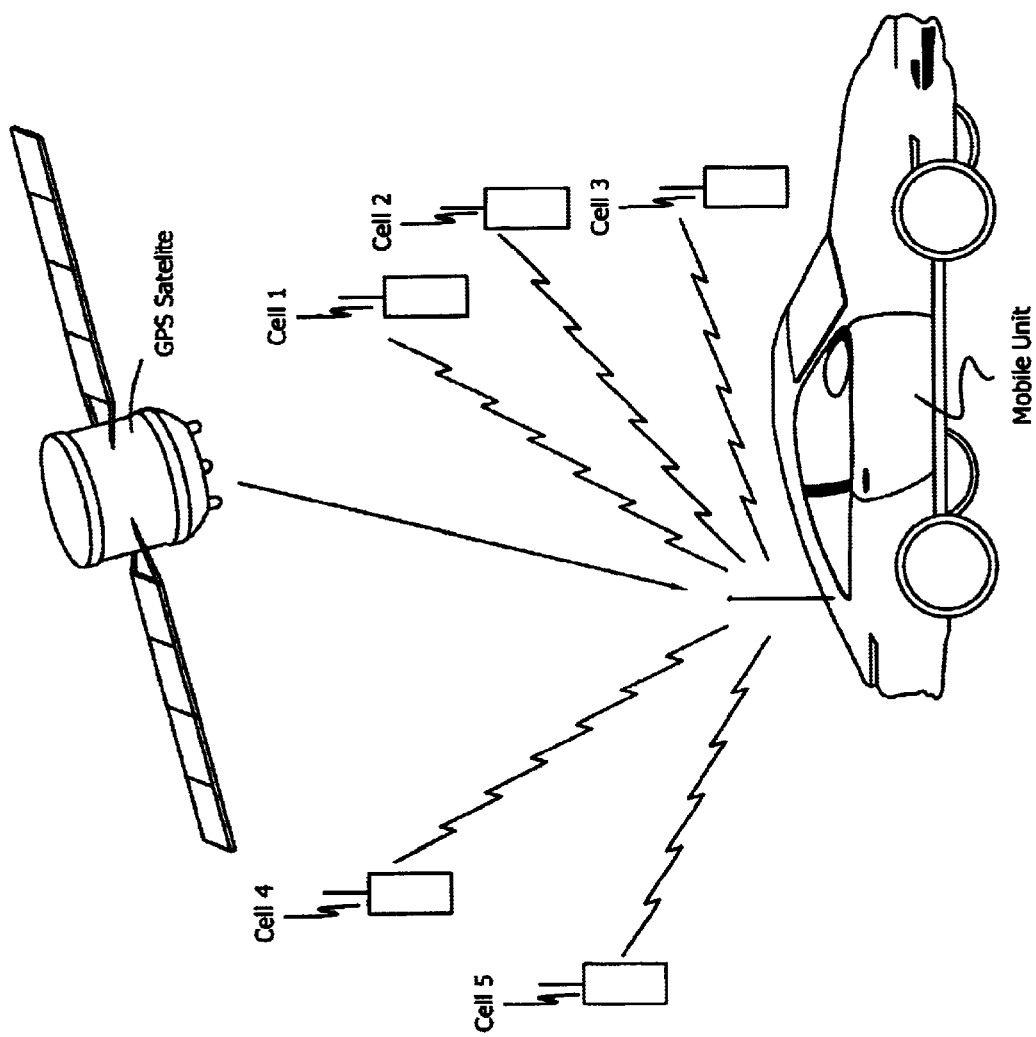
FIG. 4 is a diagram illustrating a process by which data is accumulated to be utilized in practicing the invention.

This data may be collected as is illustrated in FIG. 4 by a mobile unit driving an area with a scanning receiver and having means (typically a computer) for logging received signals against time and position. In an AMPS system, such data should be collected while a large portion of the service area is closed down so that each sector may transmit on a single frequency different from frequencies used by other sectors. This allows transmitting sectors to be identified and the strength of the transmission to be determined.

In a CDMA system, such data may be collected using a spread spectrum receiver (called a PN scanning receiver) capable of decoding the PN offset transmitted by a sector. The spread spectrum receiver measures the strength of pilot signals continuously transmitted by base stations on a control channel (the pilot channel) defined by a specific Walsh code. These pilot signals allow mobile units to determine sectors with which they should be in contact. When a pilot signal is detected on the pilot channel, the arrival time of the transmission is compared to the system initial time provided on another "synchronization" control channel to determine the PN offset of the transmission. Using the PN offset, the transmitting sectors can be identified; and the strength of the transmission received at the location from any sector may be determined. All of this data is accumulated and stored by a computer associated with the spread spectrum receiver gathering the data.

Once the data has been accumulated, it may be manipulated by computer software designed in accordance with the present invention in the manner described below. FIGS. 2 and 3 which describe the flow of the operation should be consulted to better understand this description.

With the strength of both the signal transmitted and the signal received available, path loss for each transmission from any sector to any location is determinable.

In computing the quality of service in a CDMA system, the measured strength of all transmissions arriving at each location (made up of the pilot signals, other control signals, and signals directed for users) may be summed to provide the total received strength at the location. The sum of the received strength of all signals at a location constitutes the interference level at the location (referred to as $N_o$). The strength of a pilot signal Eb which must be received at the location to provide a quality signal can then be determined as a decoded signal above a level just greater than 7 dB above the total interference level $N_o$ (after decoding). Of course, the specific level may vary in accordance with the equipment actually utilized in the operation.

The minimum signal strength necessary at a location may then be added to path loss between the location and a sector to determine a transmitted signal strength which is necessary for the channel at the sector transmitter. If this power is not available, then the sector has reached a maximum for a channel, and the location is an interference problem for the sector.

During the operation of computing the strength of transmissions from each sector, a running total of the strengths of transmissions from each sector for all locations may be accumulated and summed to determine for each sector whether total sector power is at a maximum. If so, a sector cannot provide adequate signal strength for the plurality of mobile units it must service resulting in it being an interference problem for the system.

Finally, to determine whether the mobile transmitter must provide more than its maximum power in order to furnish a quality signal from a location to a sector, the sum of all received (interfering) transmissions at a sector is determined. From this sum, a value which is 7 dB above this sum is computed to determine the minimum received signal strength necessary at the sector for a quality signal. This minimum received signal strength plus the path loss to the location provide a value indicating the signal strength which must be available at the mobile unit. If this value is greater than the maximum power available at the mobile unit, then the location is an interference problem for that sector. By computing such a necessary transmission value for each sector with which the location is expected to communicate, it may be determined whether the location poses an interference problem for each of the sectors in the system with which it could be expected to communicate.

Once all locations which may exhibit degraded service have been identified, the number of such locations is summed for the service area. This sum is multiplied by an average traffic level determined from expected traffic for the service area. If a service area is to provide service for ten mobile customers, for example, and there are a total of one hundred locations in the service area, then each location may be expected to have an average traffic level of 1/10th of a customer. This average traffic level multiplied by the number of problem locations provides a value for problem locations in the service area.

In an alternative embodiment, the various locations throughout a system are assigned traffic levels depending on historical and perspective evaluations of the amount of traffic that particular location has or is likely to experience. Then the traffic level for all of the problem areas in the service area is summed to reach a total value.

The total value for problem locations in the service area is then divided by the total number of expected users for the service area to determine a score for the service area which represents a percentage of problems for the area given the number of expected users. This score may then be compared to scores for other service areas to determine whether the particular service area is one which should be modified to improve the system. It should be noted that the particular service area may be the entire system, a portion of the system, or a service area for a single sector.

It should be noted that the use of data actually acquired by driving the system eliminates the need to make estimations based on environmental models not necessarily representative of any particular system. The method of the invention also allows the system to utilize data which is useful for many different levels of usage and to vary the levels of usage while determining the quality of service for the particular service area. This allows planning for service areas without the need to regather data.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of quantifying the quality of service in a CDMA cellular telephone system comprising:
   dividing a service area into a total number of locations served by a service area;
   identifying substantially all locations in a service area having degraded operations,
      wherein said identifying comprises:
         determining a level of transmitted signal required from each base station to each location at which signals are expected based upon said received signal level necessary for providing a quality transmission at the location and path loss between the location and each base station;
         summing the levels of all transmitted signals from each base station; and
         comparing the sum of the levels of all transmitted signals from each base
      station to the maximum transmission power of the base station;
   assigning an average service level value to each location having degraded service to represent a level of service at the location;
   summing the average service level values of each location in the service area having degraded operations;
   determining the level of service throughout the service area;
   determining the ratio of said locations receiving degraded service to said total number of locations served by said service area to obtain a value representing the quality of service for the service area;
   dividing the sum of the average service level values by the level of service throughout the service area to obtain a value representing the quality of service for the service area.

2. A method as claimed in claim 1, further comprising:
   assigning a value representative of the expected level of service to each location comprising degraded service; and
   combining said assigned values of levels of service at each location in the service area at which degraded operations may be expected to obtain an overall value representative of service degradation.

3. A method as claimed in claim 2, further comprising:

determining a probability of service value for each of said total number of locations served by a service area;

combining the probability of service values for each of said total number of locations to obtain an overall probability of service value; and dividing said overall value representative of service degradation by said overall probability of service value to obtain said value representing the quality of service for the service area.

4. A method of quantifying the quality of service in a CDMA cellular telephone system, comprising:

dividing a service area into a total number of locations served by a service area;

identifying substantially all locations in a service area having degraded operations,
wherein said identifying comprises:
determining total interference for each location in the service area from data defining signals received at the location;
determining a received signal level necessary for providing a quality transmission at each location;
determining path loss between each location and each base station;
determining a level of transmitted signal required from each base station to each location at which signals are expected based upon said received signal level necessary for providing a quality transmission at the location and path loss between the location and each base station; and
comparing maximum channel transmission power to the level of transmitted signal required;

assigning an average service level value to each location having degraded service to represent a level of service at the location;

summing the average service level values of each location in the service area having degraded operations;

determining the level of service throughout the service area;

determining the ratio of said locations receiving degraded service to said total number of locations served by said service area to obtain a value representing the quality of service for the service area; and dividing the sum of the average service level values by the level of service throughout the service area to obtain a value representing the quality of service for the service area.

5. The method as claimed in claim 4 in which said identifying substantially all locations in a service area having degraded operations further comprises:

summing the levels of all transmitted signals from each base station; and comparing the sum of the levels of all transmitted signals from each base station to the maximum transmission power of the base station.

6. A method of quantifying the quality of service in a CDMA cellular telephone system, comprising:

dividing a service area into a total number of locations served by a service area;

identifying substantially all locations in a service area having degraded operations,
wherein said identifying comprises:
determining total interference for each base station in the service area from data defining signals received at the base station;
determining a received signal level necessary for providing a quality transmission at each base station;
determining path loss between each location and each base station;
determining a level of transmitted signal required from each location to each base station at which signals are expected based upon said received signal level necessary for providing a quality transmission at the base station and path loss between the location and each such base station; and
comparing channel transmission power to the level of transmitted signal required;

assigning an average service level value to each location having degraded service to represent a level of service at the location;

summing the average service level values of each location in the service area having degraded operations;

determining the level of service throughout the service area;

determining the ratio of said locations receiving degraded service to said total number of locations served by said service area to obtain a value representing the quality of service for the service area; and dividing the sum of the average service level values by the level of service throughout the service area to obtain a value representing the quality of service for the service area.

7. A method as claimed in claim 6, further comprising:

assigning a value representative of the expected level of service to each location comprising degraded service; and combining said assigned values of levels of service at each location in the service area at which degraded operations may be expected to obtain an overall value representative of service degradation.

8. A method as claimed in claim 6, further comprising:

determining a probability of service value for each of said total number of locations served by a service area;

combining the probability of service values for each of said total number of locations to obtain an overall probability of service value; and dividing said overall value representative of service degradation by said overall probability of service value to obtain said value representing the quality of service for the service area.

* * * * *